H. E. WATKINS.
AEROPLANE LEVEL OR POSITION INDICATOR.
APPLICATION FILED APR. 24, 1919.
1,378,744.   Patented May 17, 1921.
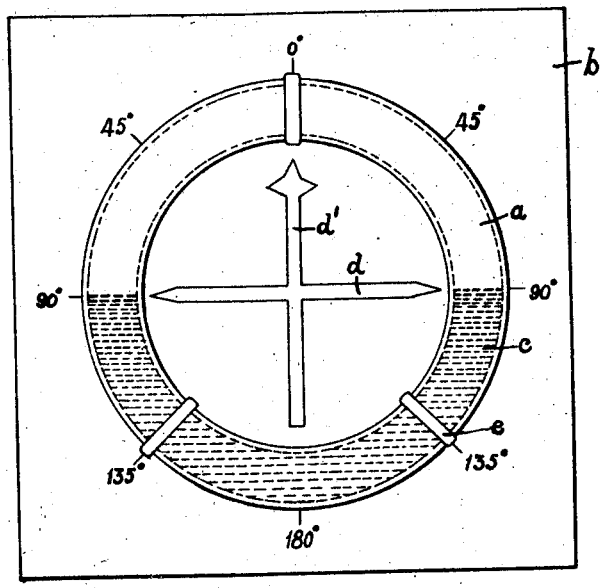

UNITED STATES PATENT OFFICE.

HAROLD ERNEST WATKINS, OF STONE LEGH, NEWTON-LE-WILLOWS, ENGLAND.

AEROPLANE LEVEL OR POSITION INDICATOR.

1,378,744. Specification of Letters Patent. Patented May 17, 1921.

Application filed April 24, 1919. Serial No. 292,335.

*To all whom it may concern:*

Be it known that I, HAROLD ERNEST WATKINS, a subject of the King of England, and residing at Stone Legh, Newton-le-Willows, in the county of Lancaster, England, have invented new and useful Improvements in Aeroplane Level or Position Indicators, of which the following is a specification.

This invention relates to means for indicating visually the position of an aeroplane or aircraft when in flight in its relation to the earth, so as to enable a pilot or observer to tell at once the position in which his aeroplane happens to be in relation to the earth.

Means for indicating the position of an aeroplane or aircraft when in flight according to this invention, consists of a tube of circular or continuous form containing mercury or other suitable liquid, and divided and marked with angle divisions; and a base or carrier upon which the tube is mounted provided with indicating lines representing horizontal and vertical pointers within the space inclosed by said tube, which is secured to the base or carrier by straps.

The tube may be of circular, elliptical, or other convenient form, and is a closed one, and the mercury or other movable medium will partially fill the tube; and the levels or positions of the surfaces of the mercury or movable medium in the tube is used in connection with the pointers or markings or the like indicia.

One part of the tube should be directly vertically over the other, when the aeroplane is in the position which it would be in when flying straight forward with the wings horizontal.

The invention is illustrated in the accompanying drawing, in connection with which it will be further described.

In this drawing, $a$ represents the tube which in this instance is circular or ring form containing mercury or other suitable liquid, and of the same diameter throughout; and it is supported or carried on a plate $b$ of wood, or other suitable material. The shaded portion at the lower half of the tube ring represents the mercury, its surface levels being in the horizontal diametrical plane of the tube. $d$ and $d^1$ represent horizontal and vertical pointers or indicating lines within the tube ring, and $e$ are straps for securing the ring on to the base or carrier $b$, which would be so arranged or in such positions that one end only of the column of mercury in the tube can be covered by any of the straps at the same time.

The parts should be so made as to render the level of the mercury as clear and easily seen as possible; and to this end, the back of the tube, that is the part farthest from the pilot or observer may be made of opal glass, and the front of clear glass, or the whole tube may be made of clear glass, in which case the part of the carrier or plate on which the tube is mounted should be white immediately behind the whole length of tube.

In some cases, the surface of the carrier or plate $b$ is black or of a dark color, except behind the tube $c$, while in others it may be white all over. If the carrier $b$ be black or dark, then the pointers of lines $d$ and $d^1$ should be white or light; and conversely, if it be white, then the pointers or lines should be black or dark; but as regards these features, namely, the rendering of the reading and indication by the instrument easy and effective, the parts and whole instrument will be got up in such a way as to accentuate the visual indicating media, or throw them up in such a way as to make the indications as visible and striking as possible.

The circle of the tube is divided and marked with angle divisions such as those indicated or given, as by these means, the level of the column of mercury will help to show the limit of safety which may be taken in banking.

The zero sign is at the highest point of the instrument, and the 180 degree mark at the lowest; and the intermediate marks at the correct intervals between zero and 180 down each side; but lower markings than those given may, if desired, be used.

In one form, the base or carrier $b$ is grooved, say to the depth of half the circle of the tube, and in this groove the posterior half of the tube will rest and be held, it being of the size and shape of the tube; and the whole front of the instrument may be covered above by a sheet of clear thick toughened glass to protect the instrument from injury. The tube $a$ also itself should be made of fairly thick and toughened glass, such as is used in the manufacture of mercurial barometer tubes.

With the instruments fixed in the positions as described, they will move with the plane, and with any alterations in direction of the plane or its relative position, or any part of it to the earth, either one or other of the instruments will rotate, and the mercury by the action of gravity retaining its level, will at once indicate by the index or pointers, the change in the pose of the plane, so as to show quite clearly whether the plane is flying horizontally with even wings, banking, ascending or descending, slipping, and when it is actually upside down.

What is claimed is:—

Means for indicating the position in flight of an aeroplane or aircraft, consisting of a vertically arranged base, an annular tube secured on said base, a quantity of mercury approximately half filling the tube, angularly related pointers fixed vertically of the base, one of the pointers having an arrow head at the upper end, and scale marks for the mercury surfaces within the tube, said scale marks having their lowest indication in line with the arrow head of the vertical pointer, the scale marks increasing in both directions from such lowest pointer to the maximum indication in line with the lowest point of the vertical pointer.

In testimony whereof I have signed my name to this specification in the presence of two subscribing witnesses.

HAROLD ERNEST WATKINS.

Witnesses:
SOMERVILLE GOODALL,
ALICE PERKINS.